M. O. HENDERSON.
TRACTOR WHEEL.
APPLICATION FILED JULY 16, 1919.
1,326,500.
Patented Dec. 30, 1919.
2 SHEETS—SHEET 2.
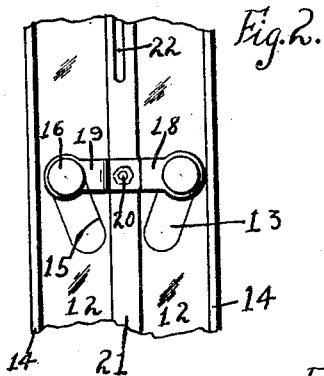
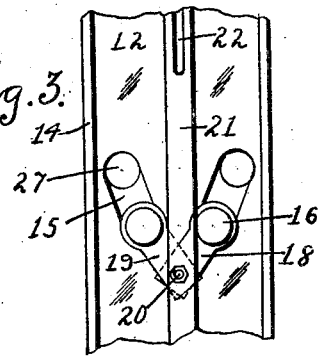
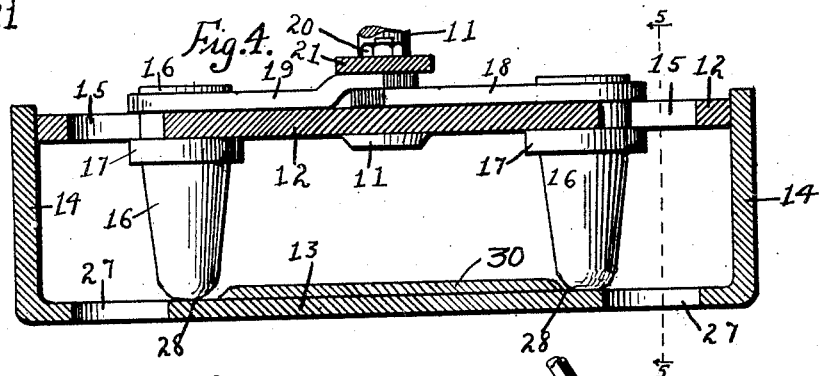
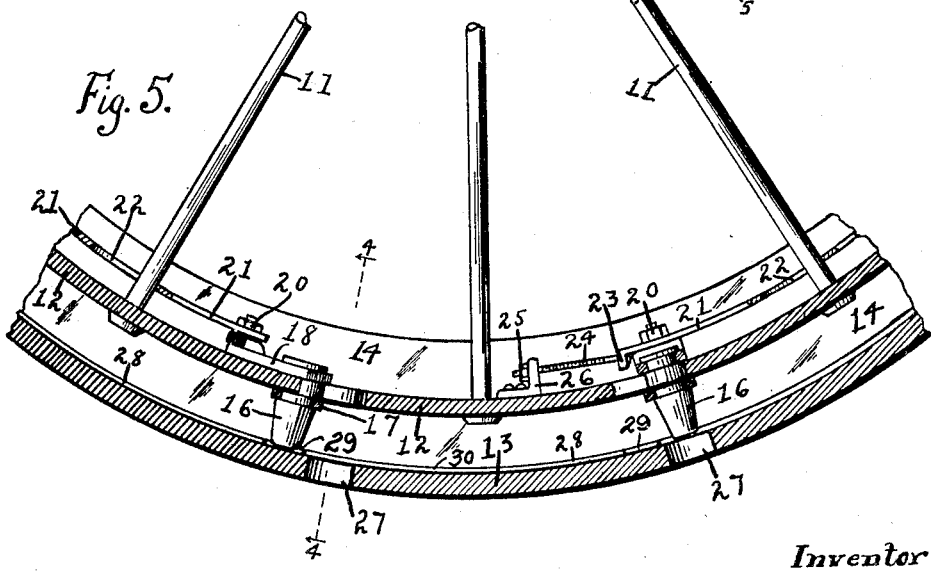
Inventor
Morris O. Henderson.
Witness
John Weber.
By Orwig & Bair, Atty's.

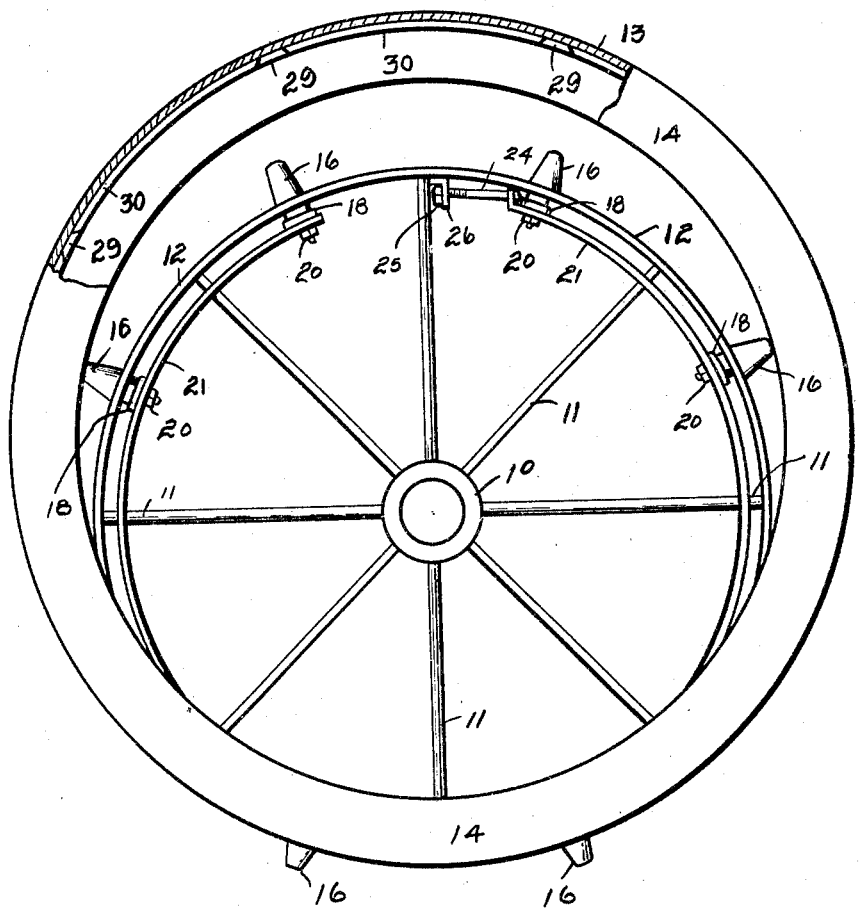

UNITED STATES PATENT OFFICE.

MORRIS O. HENDERSON, OF STORY CITY, IOWA.

TRACTOR-WHEEL.

1,326,500.　　　　Specification of Letters Patent.　　Patented Dec. 30, 1919.

Application filed July 16, 1919. Serial No. 311,368.

*To all whom it may concern:*

Be it known that I, MORRIS O. HENDERSON, a citizen of the United States, and a resident near Story City, in the county of Hamilton and State of Iowa, have invented a certain new and useful Tractor-Wheel, of which the following is a specification.

The object of my invention is to provide a tractor wheel of simple, durable and inexpensive construction.

A further object of my invention is to provide a tractor wheel having lugs thereon, which may be extended into the ground when the tractor is being moved over soft or plowed ground, and which may be retracted within an auxiliary rim, so that they will not project therefrom when the tractor is being moved over a hard surface, such for instance as a pavement.

A further object of my invention is to provide a wheel having lugs fixed thereto and an auxiliary rim loosely mounted on the wheel, so that the lugs may either project through openings in the auxiliary rim, or may be moved to position within the rim and engaged by the latter, so that the wheel may be held from movement relative to the rim.

A further object of my invention is to provide means for throwing the lugs out of alinement or register with the openings in the rim, when it is desired to have the lugs travel within the rim instead of projecting through the rim.

A further object of my invention is to provide means for simultaneously moving a portion of the lugs to position where they will not register with the openings in the rim, and then moving the balance of the lugs to the same position.

With these and other objects in view, my invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of my tractor wheel, parts being broken away to better illustrate the construction.

Fig. 2 is a top or plan view of a portion of the rim.

Fig. 3 is a similar view, showing the parts in a different position.

Fig. 4 is an enlarged detailed view taken on the line 4—4 of Fig. 5, and

Fig. 5 is a vertical, sectional view taken on the line 5—5 of Fig. 4.

Referring to the accompanying drawings, I have used the reference numeral 10 to indicate generally the hub of a wheel, having the spokes 11 and a rim 12. Deposited outside the rim 12 is a channel shaped auxiliary rim having a transverse portion 13 and in-turned flanges 14, designed to receive the rim 12. The rim 12 is provided with a plurality of pairs of spaced transversely alined slots 15, having their longitudinal axes inclined toward each other and toward the center of the rim. Slidably mounted in each of the slots 15 and projecting outwardly from the rim 12 are a plurality of lugs 16. The lugs 16 are provided with a contracted portion adjacent to the outer surface of the rim 12 designed to receive a collar 17, adapted to prevent the lugs from being pushed inwardly through the rim 12.

Received in similar contracted portions adjacent to the inner surface of the rim 12 are the ends of toggle levers 18 and 19. The inner ends of the levers 18 and 19 are pivoted together at 20 and are connected by the same pivot to a strip 21 at that point. The strip 21 is one-half of a split ring which extends around substantially half of the inner surface of the rim 12, and is slidably mounted on the spokes 11 by means of the slots 22.

One end of each strip 21 is provided with an outwardly turned lug 23, having an opening therethrough designed to receive a bolt 24, which has threads thereon to coact with a nut 25, which in turn bears against a stop device 26 secured to the inner surface of the rim 12. From the construction of the parts just described and from the showing of the parts in Figs. 2 and 3, it will be seen that movement of the strip 21 in one direction will cause the lugs to approach one end of the slots 15, and thereby assume the position shown in Fig. 2; while movement of the strip 21 in the opposite direction will cause the lugs 16 to move to the opposite ends of the slots 15 and thereby approach each other, as is shown in Fig. 3.

Openings 27 are provided in the portion 13 of the auxiliary rim, and designed to register with the outer ends of the slots 15, so that when the lugs are in the position shown in Fig. 2, they may enter the openings 27 in the manner illustrated in Fig. 1. From the construction of the parts just described, it will be seen that rotation of the wheel portion, when the device is mounted on a tractor will cause the lugs 16 to successively enter the lower openings in the auxiliary rim member, there forming a ridged traction surface at the bottom of the device.

If it should be desired, however, to present a smooth rim for any purpose, as for example driving on a concrete pavement, then the lugs adjacent to the upper part of the wheel may be drawn to the position shown in Fig. 3 by operating one of the nuts 25, thereby throwing the lugs out of register with the adjacent two openings 27. The wheel may then be rotated a half-turn, and the other nut 25 be operated to draw the strip 21 along the rim 12 to move the remaining lugs 16 to the position shown in Fig. 3. When the parts are arranged, as just described, the diameter of the inner surface of the auxiliary rim is greater than the diameter of the circle formed by the outer ends of the lugs 16 so it is possible under adverse conditions that the lugs would slip around on the inner surface of the rim 13. In order to obviate the possibility of such slipping, I have provided a strip 30, which extends around the inner surface of the rim 13, and which is provided at either edge with alined recesses 29, adapted to receive the ends of the lugs 16, when they are in the position shown in Fig. 3, to thereby prevent rotation of the wheel relative to the auxiliary rim.

In this connection it will be noted that these recesses 29 are spaced a distance from each other equal to the distance between the ends of the lugs 16, so that they will not all be alined transversely with the openings 27, but that slippage of the lugs on the inner surface of the rim 13 will cause the lugs to position themselves within the recesses.

It will be understood that a similar result might be accomplished by a number of other means, such for instance as providing depressions in the inner surface of the member 13, and I do not desire to limit myself to the particular means shown for locking the wheel from movement relative to the auxiliary rim, when the lugs are moved to position out of register with the openings 27.

An advantage of the construction used in my device, resides in the fact that the tractor or other motor vehicle upon which the device is mounted may be moved over concrete or other hard surface roads without injury to the roads, due to projecting lugs.

The same wheel may also be used for driving over plowed or soft ground, and the lugs necessary for such conditions be used.

Another advantage of this construction, resides in the fact that the lugs may be moved from position where they project from the auxiliary rim to position where they are confined within the rim by simply turning a pair of nuts, and without jacking-up the tractor or disturbing any of its working parts.

Some changes may be made in the construction and arrangement of the various parts of my improved device without departing from the essential features and purposes of my invention, and it is my intention to cover by my claims, any modified forms of structure or use of mechanical equivalents which may be reasonably included within their scope.

I claim as my invention:

1. In a device of the class described, a wheel having a plurality of lugs projecting from the rim thereof, an auxiliary rim having inwardly projecting flanges at either edge adapted to form a channel to receive the rim of the first described wheel, said auxiliary rim having a plurality of spaced openings therein adapted to successively receive said lugs, and means for holding the wheel in position to prevent the lugs from projecting from said openings.

2. In a device of the class described, a wheel having a plurality of lugs projecting from the rim thereof, an auxiliary rim having inwardly projecting flanges at either edge adapted to form a channel to receive the rim of the first described wheel, said auxiliary rim having a plurality of spaced openings therein adapted to successively receive said lugs, and means for moving the lugs to position out of alinement with said openings.

3. In a device of the class described, a wheel having a plurality of lugs projecting from the rim thereof, an auxiliary rim having inwardly projecting flanges at either edge adapted to form a channel to receive the rim of the first described wheel, said auxiliary rim having a plurality of spaced openings therein adapted to successively receive said lugs, means for holding the wheel in position to prevent the lugs from projecting from said openings, and means for holding the wheel from rotation relative to the auxiliary rim when the parts are in the last described position.

4. In a device of the class described, a wheel, a plurality of spaced pairs of transversely alined lugs extended from the rim thereof, means for moving the lugs of each pair toward and from each other, and an auxiliary rim disposed outside of said lugs and having a plurality of pairs of spaced transversely alined openings therethrough adapted to successively receive the lugs when the latter are in certain of their adjusted positions.

5. In a device of the class described, a wheel, a plurality of spaced pairs of transversely alined lugs extended from the rim thereof, means for moving the lugs of each pair toward and from each other, an auxiliary rim disposed outside of said lugs and having a plurality of pairs of spaced transversely alined openings therethrough adapted to successively receive the lugs when the latter are in certain of their adjusted positions, and means for retaining the edges of the wheel rim and the auxiliary rim substantially in alinement.

6. In a device of the class described, a wheel, a plurality of spaced pairs of transversely alined lugs extended from the rim thereof, means for moving the lugs of each pair toward and from each other, an auxiliary rim disposed outside of said lugs and having a plurality of pairs of spaced transversely alined openings therethrough adapted to successively receive the lugs when the latter are in certain of their adjusted positions, and means for holding the wheel from rotation relative to the auxiliary rim in any of their positions.

7. In a device of the class described, a wheel, a plurality of spaced pairs of transversely alined lugs extended from the rim thereof, means for moving the lugs of each pair toward and from each other, an auxiliary rim disposed outside of said lugs and having a plurality of pairs of spaced transversely alined openings therethrough adapted to successively receive the lugs when the latter are in certain of their adjusted positions, and means disposed on the inner surface of the auxiliary rim adapted to engage the ends of the lugs to lock the latter from movement relative to the rim.

Des Moines, Iowa, July 1, 1919.

MORRIS O. HENDERSON.